United States Patent
Brown

(10) Patent No.: US 10,877,964 B2
(45) Date of Patent: Dec. 29, 2020

(54) METHODS AND SYSTEMS TO FACILITATE THE GENERATION OF RESPONSES TO VERBAL QUERIES

(71) Applicant: Dennis E. Brown, Newport Beach, CA (US)

(72) Inventor: Dennis E. Brown, Newport Beach, CA (US)

( * ) Notice: Subject to any disclaimer, the term of this patent is extended or adjusted under 35 U.S.C. 154(b) by 0 days.

(21) Appl. No.: 16/661,442

(22) Filed: Oct. 23, 2019

(65) Prior Publication Data

US 2020/0125565 A1 Apr. 23, 2020

Related U.S. Application Data

(60) Provisional application No. 62/749,376, filed on Oct. 23, 2018.

(51) Int. Cl.
*G06F 16/20* (2019.01)
*G06F 16/2452* (2019.01)
*G06F 16/632* (2019.01)
*G06F 16/248* (2019.01)

(52) U.S. Cl.
CPC ...... *G06F 16/24522* (2019.01); *G06F 16/248* (2019.01); *G06F 16/632* (2019.01)

(58) Field of Classification Search
None
See application file for complete search history.

(56) References Cited

U.S. PATENT DOCUMENTS

| 7,493,642 B2 * | 2/2009 | Shintani | H04N 21/454 |
| | | | 725/44 |
| 7,725,307 B2 * | 5/2010 | Bennett | G06F 17/27 |
| | | | 704/9 |
| 9,798,977 B2 | 10/2017 | Saxena et al. | |
| 10,275,539 B2 | 4/2019 | Krasadakis | |
| 2001/0039493 A1 * | 11/2001 | Pustejovsky | G10L 15/18 |
| | | | 704/235 |
| 2018/0075335 A1 | 3/2018 | Braz et al. | |
| 2019/0171777 A1 * | 6/2019 | Sobhy Deraz | G06F 9/54 |
| 2019/0278857 A1 * | 9/2019 | Ni | G06F 16/2425 |

FOREIGN PATENT DOCUMENTS

| WO | WO2007088536 A2 | 8/2007 |
| WO | WO2016054230 A1 | 4/2016 |

* cited by examiner

*Primary Examiner* — Belix M Ortiz Ditren

(57) ABSTRACT

A method to facilitate the generation of business intelligence insights in business intelligence insight to verbal conversational requests for statistical analysis related to at least one sector, which has: receiving at least one verbal conversational request for statistical analysis and business intelligence insights associated with the at least one sector from at least one user device associated with at least one user; analyzing the at least one verbal conversational request for statistical analysis and business intelligence insights; identifying at least one dataset based on the analyzing; retrieving the at least one dataset from at least one database; generating at least one business intelligence insight corresponding to the at least one verbal conversational request for statistical analysis and business intelligence insights based on the at least one dataset; and transmitting the at least one business intelligence insight to the at least one user device.

16 Claims, 11 Drawing Sheets

US 10,877,964 B2

METHODS AND SYSTEMS TO FACILITATE THE GENERATION OF RESPONSES TO VERBAL QUERIES

The current application claims a priority to the U.S. Provisional Patent application Ser. No. 62/749,376 filed on Oct. 23, 2018.

FIELD OF THE INVENTION

Generally, the present disclosure relates to the field of data processing. More specifically, the present disclosure relates to methods, systems, apparatuses and devices for analyzing activity data, performance data, financial data, social services data and other data based on verbal queries.

BACKGROUND OF THE INVENTION

Currently, there is a huge lack of an accessible analytical system for activity data, performance data, financial data and other data. Users of activity data, performance data, financial data, social services data, and other data have a need for quick, easy access to answers that are precise, accurate, timely and accessible. Accessing the data places enormous burdens on the users. The current state of the art is to store data in various data stores including files, spreadsheets, databases, and proprietary applications. In order to access these data stores, the user must know of their existence, know their location, and then know how to access them and to know their structure and format. In many cases, accessing the data requires detailed knowledge of how to use complicated software products with barriers to access and counter-intuitive command structures. Users generally must be at their desks to access the analyses, or often utilize technicians and data scientists to answer their questions, which introduces delays and potential for misunderstanding. It also limits opportunities for follow-up or drill-down questions which may occur to users once they have seen the initial business intelligence insight.

The majority of the ubiquitous search engines existing, provide queries across multiple public data sources. But internet searches are merely the first step in a researcher's journey, as they cannot access private data sources and their output format is rarely useful in a business context. Also, their support for follow-up or drill-down questions is non-existent.

More often than not, search engines return not answers, but a list of documents which might or might not contain the answers a user is looking for. Even when the request for statistical analysis and business intelligence insights tools provide datasets and business intelligence insights, that are responsive to users' queries, users who need to combine these business intelligence insight and business intelligence insight in order to create meaningful reports face a big challenge.

When searching for activity, performance, financial or social services data, executives and knowledge workers require useful reports that exactly answer their questions. They often need to drill down into the data, breaking totals into categories based on attributes of the subject matter, typically spread across numerous data sources.

Therefore, there is a need for improved systems and methods to make use of newly available artificial intelligence processors to access these data and overcome the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some aspects, a method to facilitate the generation of business intelligence insights in response to verbal queries related to at least one sector is disclosed. The method may include receiving, using a communication device, at least one verbal conversational request for statistical analysis and business intelligence insights associated with the at least one sector from at least one user device associated with at least one user. Further, the method may include analyzing, using a processing device, the at least one verbal conversational request for statistical analysis and business intelligence insights. Further, the method may include identifying, using the processing device, at least one dataset based on the analyzing. Further, the method may include retrieving, using a storage device, the at least one dataset from at least one database. Further, the method may include generating, using the processing device, at least one business intelligence insight corresponding to the at least one verbal conversational request for statistical analysis and business intelligence insights based on the at least one dataset. Further, the method may include transmitting, using the communication device, the at least one business intelligence insight to the at least one user device.

According to some aspects, a system to facilitate the generation of business intelligence insights based on verbal conversational requests for statistical analysis related to at least one sector is disclosed. The system comprises a communication device, a processing device and a storage device. Further, the communication device may be configured for receiving at least one verbal conversational request for statistical analysis and business intelligence insights associated with at least one sector from at least one user device associated with at least one user. Further, the communication device may be configured for transmitting at least one business intelligence insight to the at least one user device. Further, the processing device may be configured for analyzing the at least one verbal conversational request for statistical analysis and business intelligence insights. Further, the processing device may be configured for identifying at least one dataset based on the analyzing. Further, the processing device may be configured for generating the at least one business intelligence insight corresponding to the at least one verbal conversational request for statistical analysis and business intelligence insights based on the at least one dataset. Further, the storage device may be configured for retrieving the at least one dataset from at least one database.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings may contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

GLOSSARY

Figure 1:
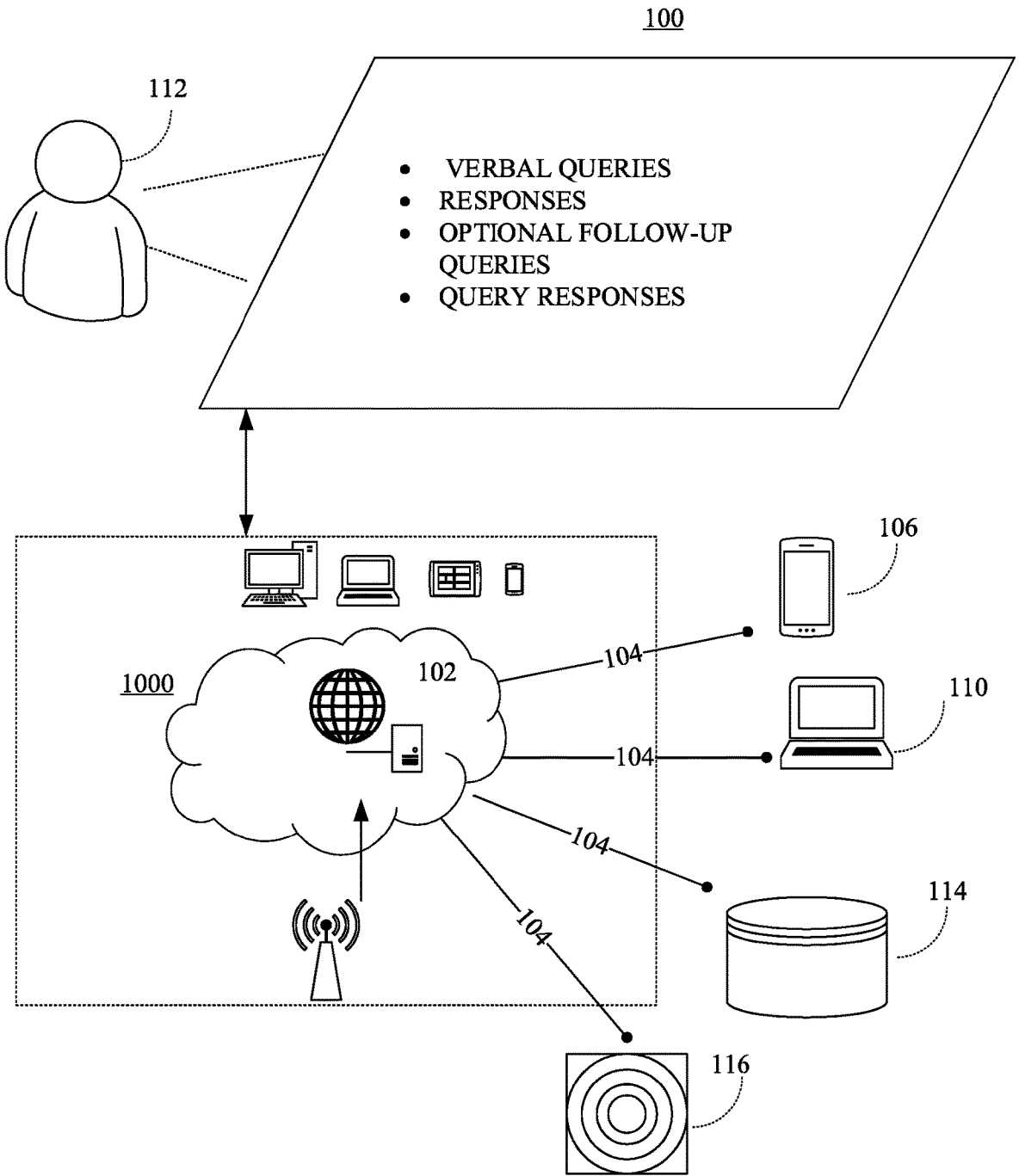
FIG. 1 is an illustration of an online platform consistent with various embodiments of the present disclosure.

By the term 'business intelligence insight' is meant the following: calculated analyses, summaries, descriptions, transformations, visualizations, correlations, projections and datasets derived from databases to enable users to comprehend, explain, describe, understand and present insights about processes such as measures of actual activities, actions and performance.

By the term 'dataset' is meant the following: a set of data retrieved or statistically derived from one or more databases and organized to enable and support production of business intelligence insights.

By the term 'conversational' is meant the following: user accesses and utilizes data without having to provide the name or location of the database(s) to be utilized; neither is the user required to provide the names of the fields to be utilized; neither is the user required to provide the format of the desired dataset. The user can describe the answers and data sought in plain English. In addition, once the business intelligence insight has been received, the user, the user may give additional queries, requests and commands to alter or refine, augment, break down, drill down, refine or analyze the resultant dataset.

By the term 'statistical analysis' is meant the following: retrieving at least one dataset from at least one database numerical, textual, graphical, audio or visual data and performing numerical, arithmetic, deterministic or probabilistic, ordinal or cardinal calulcations to transform the dataset into useful information.

DETAILED DESCRIPTION OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one." but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating the generation of analyses, summaries, descriptions, transformations, visualizations, correlations and projections based on verbal queries related to activity, performance and/or financial data or other information, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof.

Overview:

The present disclosure may describe systems and methods to facilitate the generation of business intelligence insights based on verbal queries related to economic sectors. Further, the systems and methods may facilitate users to find answers to questions regarding social services statistics. Further, the social service statistics may be associated with the needs of the people, resource utilization and outcomes. Further, the users may describe the question to a personal electronic device. Further, the user may describe the question in plain English. Further, the personal electronic device may utilize an artificial intelligence engine to interpret the description associated with the question. Further, the personal electronic device then utilizes a second artificial intelligence engine to determine the best strategy to find the answers to the questions and then initiates a search across multiple public and private data sources for the answer associated with the question. Further, the artificial intelligence engine may determine additional information that may be needed to satisfy requests associated with the question. Further, the artificial intelligence engine may determine the additional information by requesting the additional information from the user through initiating a request for statistical analysis and business intelligence insights back to the user asking for the additional information and/or offering choices the user may select.

Further, the disclosure describes one or more computer programs that extract meaning from the user's spoken descriptions of the question to which the user may be seeking the answer. Further, the system may determine available data resources that may contain data that may be used to formulate the answer. Further, the system may determine the best way to communicate with the data resources and may determine which of the components of the data resource contains the data that may be used to formulate the answer. Further, the system formulates one or more queries to extract the data and determines a way in which the data elements may relate to one another. Further, the system determines which report format that may be the best way to communicate the answer. Further, the report format may be associated with a stored library of available report formats. Further, the system may determine the desired destination of the answer and delivers the correct business intelligence insight associated with the answer to the user via various communication links to one or more personal electronic devices associated with the user.

Further, the disclosure may describe a method to facilitate the generation of business intelligence insights based on verbal queries related to sectors. Further, the method may include receiving a request for statistical analysis and business intelligence insights spoken into a personal electronic device. Further, the method may include analyzing the input string to determine whether it is a bona fide request for statistical analysis and business intelligence insights. Further, the method may include utilizing an adaptive artificial intelligence language understanding module embedded into a recognition engine to, determine which databases to search to find the requested data, and forming a plurality of computer-executable queries to retrieve the requested data. Further, the method may include determining the best form with which to deliver of requested output. Further, the method may include retrieving the requested data from the indicated database(s). Further, the method may include formatting the retrieved data according to the form indicated. Further, the method may include transmitting the formatted dataset to the indicated output destination. Further, the method may include analyzing which additional queries or datasets and business intelligence insight and business intelligence insight will be of interest to the user. Further, the method may include transmitting the formatted dataset to the user's personal electronic device and also to additional personal electronic devices as indicated by the user. Further, the method may include transmitting to a personal device a list of recommended additional datasets and business intelligence insight and business intelligence insight, such list being rendered so as to enable the user to easily retrieve the recommended datasets and business intelligence insight and business intelligence insight.

Further, the decisions of which databases to search for answers and which data sets to recommend for additional consideration are in part determined by the characteristics of the individual user, which characteristics may include history, previous retrievals, company affiliation, title, and other factors. Further, the user data source may include a log of past queries made, actions taken, data requested and business intelligence insights previously created and utilized by the user. Further, the formatted dataset may include data from any accessible proprietary and/or public databases and data sources. Further, ambiguities in the request may be resolved by the recognition engine presenting the user with two or more alternatives and enabling the user to select one. Further, the personal electronic device may be a smartphone, a watch, a personal computer or a laptop computer, a website, an automobile, a telephone headset or handset, or any other device capable of receiving spoken queries and displaying or directing the display of formatted data results or text results. Further, the present disclosure may describes a set of computer program products comprised of non-transitory computer-executable code embodied in a non-transitory computer-readable medium that, when executed on a personal electronics device or another computer responding to messages from the personal electronics device performs the steps of receiving a communication spoken or otherwise created by the user to initiate a request for statistical analysis and business intelligence insights, and using an adaptive artificial intelligence language understanding program to analyze the communication to determine a set of data that responds to the communication and to determine the format in which the business intelligence insight should be rendered, and creating a formatted dataset that satisfies the user's request, and delivering and/or displaying the report to one or more personal electronic devices. Further, the determination of contents, format, and destination of the formatted data set created in response to the user's request for statistical analysis and business intelligence insights are based in part on an external data source holding data regarding the user's title, position and historical choices.

Further, the present disclosure may describe a personal electronic device comprised of a processor, a memory, and a user interface. Further, the processor may be coupled to the memory and to the user interface. Further the processor configured to receive a communication, analyze the communication to determine which network-accessible physical computers are available to the user that of those which contain the databases that contain the data necessary to fulfill the request and which specific databases contain the data necessary to fulfill the request and to determine which set of data items is necessary to fulfill the request and to determine what transformations of the data are necessary to fulfill the request and to determine the report format in which the business intelligence insight should be rendered in order to fulfill the request, and to create a formatted dataset that satisfies the user's request, and to deliver and/or displaying the report to one or more personal electronic devices.

Further, the present disclosure may describes a method wherein the processor detects any ambiguities in the request for statistical analysis and business intelligence insights that lacks logic or data to resolve, and formulates queries designed to resolve the aforementioned ambiguities and transmits to the user's personal electronic device the queries and receives from the personal electronic device business intelligence insights to the queries and utilizes these business intelligence insights to formulate a request for statistical analysis and business intelligence insights from the data store and determines a set of data that responds to the communication determine the format of the dataset in which the business intelligence insight should be rendered, and creates a formatted dataset that satisfies the user's request, and delivers and/or displays the report to one or more personal electronic devices.

Further, the present disclosure describes a method whereby data values once formatted and delivered can be sorted or allocated by various criteria or statistically analyzed the results of which processes are displayed on one or more personal electronic devices to grant further insight. These analytical functions operating on the formatted dataset may be initiated by voice command, typed or by tapping an available touch-enabled screen.

Further, the present disclosure describes a method whereby data values, graphs, charts, paragraphs or other formatted data output, once formatted and delivered may be displayed on one or more personal electronic devices as formatted data tables, graphical bar charts, graphical pie charts or other graphical representations.

Further, the present disclosure may be associated with the field of artificial intelligence. More specifically the present disclosure may be associated with the field of electronic personal assistants using adaptive intelligence to evaluate user-generated queries and provide answers.

Further, the present disclosure enables users to verbally, conversationally request and analyze data describing social services resources, utilization, needs, or funding. Further, the present disclosure enables users to access and integrate data from multiple data sources into a single formatted dataset. Further, the present disclosure enables users to render the dataset that constitutes the answer to graphs and charts. Further, the present disclosure enables users to gather selected formatted datasets and business intelligence insight and business intelligence insight into a single report. Further, the present disclosure enables users to transmit datasets and business intelligence insight and business intelligence insight and/or reports to third parties by any available transmission mode including SMS Text, e-Mail or such other mechanism as the user may be able to utilize. Further, the present disclosure detects ambiguities in a request for statistical analysis and business intelligence insights and proactively request clarification when necessary. Further, the present disclosure provides the user with a voice-driven experience. Further, the present disclosure enables the display of results on the user's personal electronic device(s) including projected onto a website, such projection controlled by voice, typing text, by tapping icons on a smartphone screen. Further, the present disclosure may facilitate monitoring of selected data values (stored or derived) and enablement of notification messages sent to designated individual's smartphones when such values cross a designated threshold or a specific keyword appears in a new entry to any monitored database.

Further, the present disclosure describes a user of a personal electronic device using 'conversational' language to describe a request for data from a system. By the term 'conversational' is meant the following: user is not required to provide the name or location of the database(s) to be searched; neither the user is required to provide the names of the fields to be searched; neither is the user required to provide the format of the desired dataset. The user can describe the answers and data sought in plain English. In addition, once the business intelligence insight has been received, the user, the user may give additional commands to alter or refine, augment, break down, drill down or analyze the resultant data set. Further, a device is a personal electronic device as described herein including but not limited to smartphone, laptop computer, desktop computer, or telephone with headset, such personal electronic device being capable of receiving words spoken or typed constituting a string of words which will be analyzed to determine intent of the user and objects of the search. Such a device is also capable of electronic communication with the coordination server, such communication exemplified but not limited to Bluetooth, Wi-Fi, or telephonic protocol. The personal electronic device operates the software with the capability to capture English or other language words or to communicate with other servers to recognize and transcribe such English or other-language words and transmitting them as text. A preferred embodiment of this invention is a smartphone containing within it a microphone, speaker and screen to enable communication with the user. But other configurations are encompassed as well. For example, a headset without an embedded screen can be envisioned and encompassed, with the results being displayed on a screen separate from the headset, accessed via telephonic or data communication system. Further, the communication interface, such as a Wi-Fi, Bluetooth, or neural interface serves as the user's primary means of interaction with the system, transmitting to the remote processing server(s) commands, and receiving data in response to queries from the system. The personal electronic device serves as a communication link to the remote processing server(s) and other services, such as telephony, speech-to-text services, and Internet services. The remote processing server(s) perform the bulk of the system's processing tasks and serve as the central management point for the user's data, although some of these functions can be performed by the personal electronic device as its capabilities permit. The personal electronic device and the communications interface are connected to the remote processing server(s) via a communications network, such as a computer or telephony network. The processing server(s) maintain links with numerous data sources. Some of these data sources are proprietary to the user and/or his/her organization. Others are available to the public. The data sources named in are exemplary, not limiting and any single implementation of the invention will surely access data sources different from those listed herein. A key feature of this embodiment is that the processing server maintains the data and logic necessary to enable the instant user's access to the data source so the user does not have to re-establish his/her credentials each time the invention is used. The processing server also maintains a dictionary of all the data in all the connected servers. Thus the user can specify the data he/she is looking for, and the processing server can "find" it, along with access protocols and credentials to enable search and retrieval of the desired data. The input string spoken by the user is transmitted to the Speech to Text Conversion Program. Speech to Text Conversion Program converts speech to text and transmits text to Artificial Intelligence Language Understanding Module. Artificial Intelligence Language Understanding Module is any commercial or proprietary product that reliably converts a text string into computational objects such as intents and objects capable of conveying user's needs to the remote processing modules. The Data Source Identification Module receives contained computational objects such as intents and objects and by means of logic, computation, table lookup and/or artificial intelligence processes identifies the names and addresses of the data sources containing the requested data value(s). The Data Format Identification Module receives an object(s) and intents contained in messages and by means of table lookup and/or artificial intelligence processes identifies the form of the output that the user has requested. Such form may be, for example, a spoken or displayed scalar value, a formatted data table, a graph, a spoken or displayed text paragraph or other format as indicated by the user's request for statistical analysis and business intelligence insights and/or user's history and context. The Data Source Identification Module receives an object(s) and intents contained in messages and by means of table lookup and/or artificial intelligence processes identifies the data sources which contain the data values to be used by the artificial intelligence data retrieval module to formulate the response to user's request for statistical analysis and business intelligence insights. The Data Analysis Module receives a computational object(s) and intent(s) contained in message and data values contained in the message and performs such calculations and data transformations as are indicated in messages to create the desired data set(s). The Data Formatting Module receives messages containing the data formatting instructions received from the Data Format Identification Module and receives the data value(s) from the Data Analysis Module and creates the formatted data set(s) that will be conveyed to the Data Delivery Module. The Data Delivery Module receives the formatted data set(s) from the Data Formatting Module and conveys it to the user's personal electronic device and/or such other device(s) as are indicated by the user's settings and/or instructions.

FIG. 1 is an illustration of an online platform 100 consistent with various embodiments of the present disclosure. By way of non-limiting example, the online platform 100 to facilitate the generation of business intelligence insights based on verbal queries related to activity, performance and/or financial data or other information may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1000.

Figure 2:
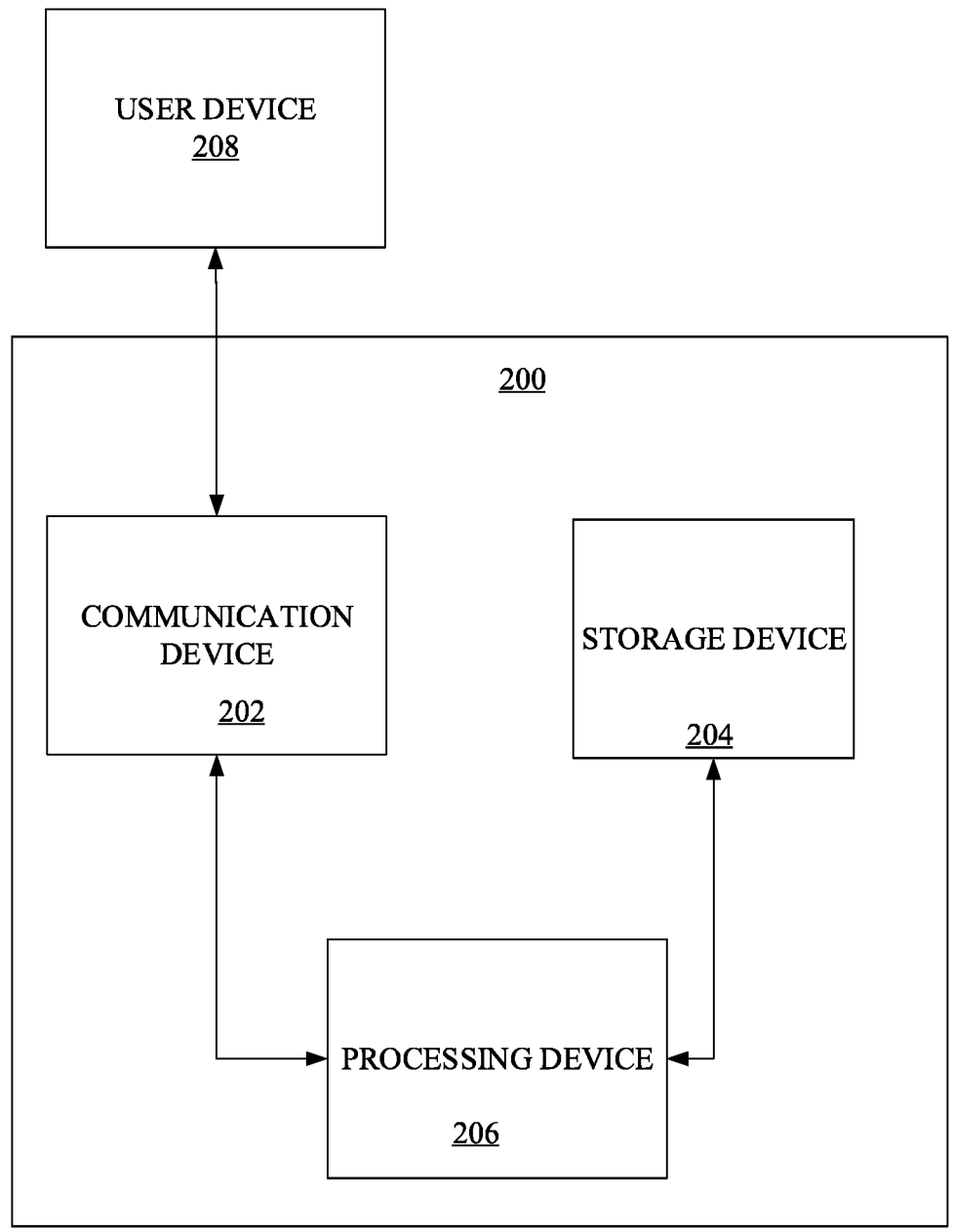
FIG. 2 is a block diagram of a system to facilitate the generation of business intelligence insights based on verbal conversational requests for statistical analysis, in accordance with some embodiments.

FIG. 2 is a block diagram of a system 200 to facilitate the generation of business intelligence insights based on verbal queries related to at least one sector in accordance with some embodiments.

Further, the business intelligence insights may include analyses, summaries, descriptions, transformations, visualizations, correlations and projections.

Further, the at least one sector may include one or more of social activity, business activity, performance, financial services, social services or other data. Further, social activity data may consist of data describing or counting such as demographic data, statistics on population, socio-economic data, healthcare data, and so on. Further, business activity data may consist of data describing or counting equipment, supplies, orders, productions, events such as equipment failures, sales milestones, call center activity, and so on. Further, performance data may consist of time-based entries, personal and/or unit achievements, comparisons and differences across business, national, local, weather, and/or environmental boundaries and, sports performances and so on Further, the queries may be in different language, structure, organization, etc. Further, the language may include, but not limited to, English, Spanish, Arabic, French, Russian, Chinese, etc.

Further, the system 200 may include a communication device 202, a storage device 204, and a processing device 206. The communication device 202 may be configured for receiving at least one verbal conversational request for statistical analysis and business intelligence insights associated with activity, performance and/or financial data or other information from at least one user device 208 associated with at least one user. Further, the communication device 202 may be configured for transmitting at least one business intelligence insight to the at least one user device 208.

The processing device 206 may be configured for analyzing the at least one verbal conversational request for statistical analysis and business intelligence insights. Further, the processing device 206 may be configured for identifying at least one dataset based on the analyzing. Further, the processing device 206 may be configured for generating the at least one business intelligence insight corresponding to the at least one verbal conversational request for statistical analysis and business intelligence insights based on the at least one dataset. Further, the storage device 204 may be configured for retrieving the at least one dataset from at least one database.

In some embodiments, the processing device 206 may be configured for analyzing the at least one verbal conversational request for statistical analysis and business intelligence insights. Further, the analyzing may comprise performing natural language processing (NLP) on the at least one verbal conversational request for statistical analysis and business intelligence insights. Further, the natural language processing may be configured for interpreting the at least one verbal conversational request for statistical analysis and business intelligence insights. Further, the at least one verbal conversational request for statistical analysis and business intelligence insights may be rendered in the user's natural language.

Further, the artificial intelligence analysis may be configured to determine at least one query indicator. Further, the at least one query indicator may correspond to the at least one verbal conversational request for statistical analysis and business intelligence insights. Further, the at least one query indicator may facilitate the identifying of the at least one dataset.

In further embodiments, the communication device 202 may be configured for receiving original data from a data source device. Further, the processing device 206 may be configured for preprocessing the original data. Further, the processing device 206 may be configured for generating the at least one dataset based on the preprocessing. Further, the storage device 204 may be configured for storing the at least one dataset to the at least one database. Further, the storage space of the at least one dataset may be substantially less than the storage space of the original data. Further, the processing device 206 may be configured for identifying the at least one dataset based on the analyzing of the at least one verbal conversational request for statistical analysis and business intelligence insights.

In further embodiments, the communication device 202 may be configured for receiving an update variable associated with the at least one dataset from at least one user device 208. Further, the processing device 206 may be configured for analyzing the update variable. Further, the processing device 206 may be configured for updating the at least one dataset based on the analyzing. Further, the at least one dataset may be updated through the original data. Further, the processing device 206 may be configured for identifying the at least one dataset based on the analyzing of the at least one verbal conversational request for statistical analysis and business intelligence insights.

In some embodiments, the storage device 204 may be configured for retrieving consideration data associated with the at least one user from a database. Further, the consideration data may comprise at least one user characteristic. Further, the at least one user characteristic may be associated with the at least one user. Further, the processing device 206 may be configured for identifying the at least one dataset based on the consideration data.

In some embodiments, the communication device 202 may be configured for receiving at least one user device characteristic associated with the at least one user device 208 from the at least one user device 208. Further, the processing device 206 may be configured for generating the at least one business intelligence insight based on the at least one user device characteristic.

In some embodiments, the processing device 206 may be configured for determining the existence of any ambiguities in any request for statistical analysis and business intelligence insights rendered by the user. Further, the processing device 206 may be configured for generating an ambiguity resolution request for statistical analysis and business intelligence insights based on the determining. Further, the communication device 202 may be configured for transmitting the one ambiguity resolution request for statistical analysis and business intelligence insights enabling the user to clarify the request for statistical analysis and business intelligence insights to the at least one verbal conversational request for statistical analysis and business intelligence insights to the at least one user device 208. Further, the communication device 202 may be configured for receiving an ambiguity resolution response corresponding to the ambiguity resolution request for statistical analysis and business intelligence insights from the at least one user device 208. Further, the processing device 206 may be configured for identifying the at least one dataset based on an ambiguity resolution response.

In some embodiments, the communication device 202 may be configured for transmitting the at least one dataset to the at least one user device 208. Further, the at least one user device 208 may be configured to receive any number of additional queries enabling user to expand or reduce the scope of the response, further his/her understanding of the data, transform it, further analyze it, or ask for additional attributes associated with the at least one dataset from the at least one user. Further, the at least one user device 208 may be configured to generate at least one additional response based on the at least one additional request for statistical analysis and business intelligence insights. Further, the at least one user device 208 may be configured to present the at least one additional response to the at least one user.

In some embodiments, the communication device 202 may be configured for receiving at least one data representation type from at least one user device 208. Further, the processing device 206 may be configured for generating the at least one business intelligence insight based on the at least one data representation type.

Figure 3:
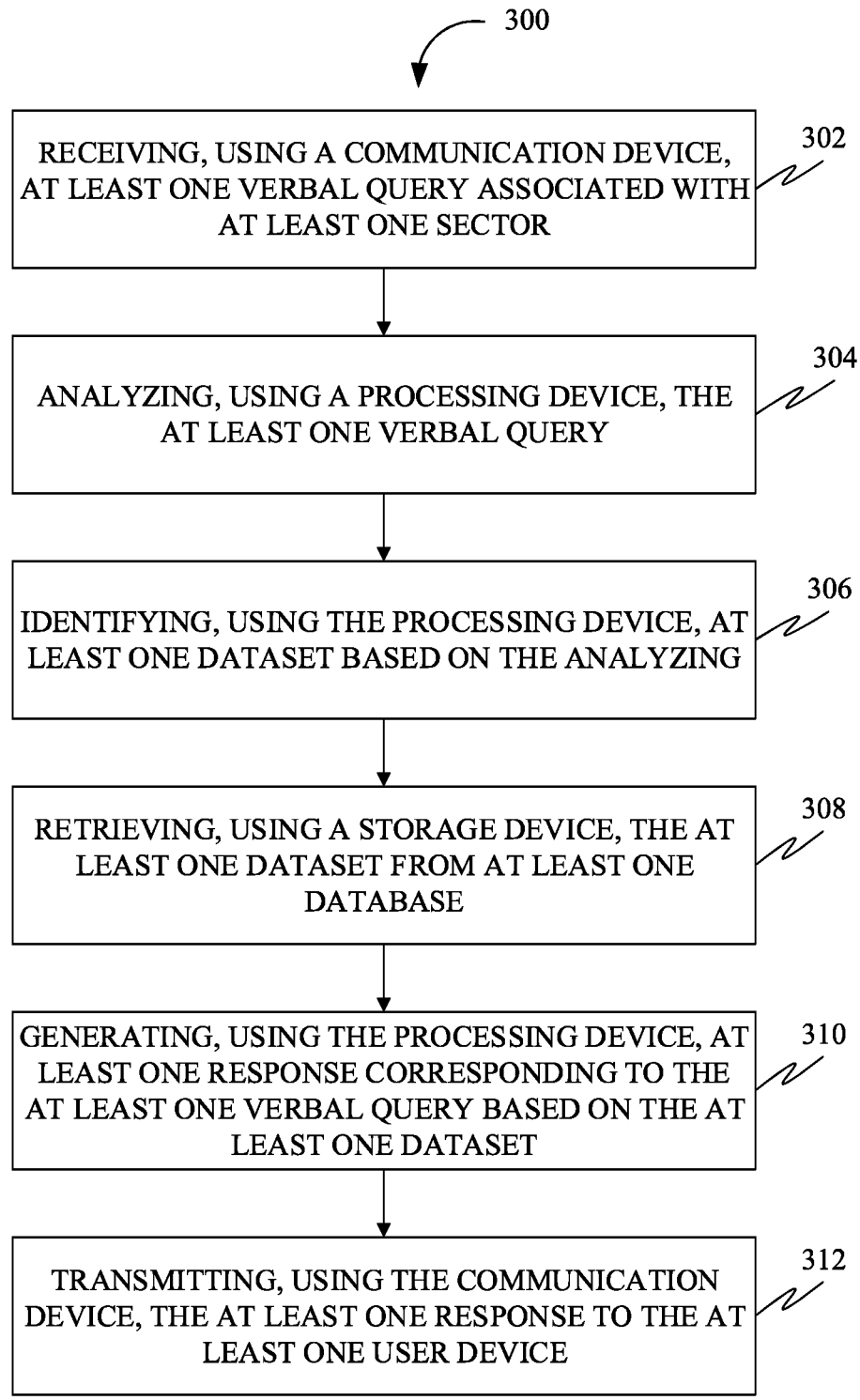
FIG. 3 is a flowchart of a method to facilitate the generation of business intelligence insights based on verbal conversational requests for statistical analysis, in accordance with some embodiments.

FIG. 3 is a flowchart of a method 300 to facilitate the generation of business intelligence insights based on verbal queries related to at least one sector, in accordance with some embodiments. Further, the business intelligence insights may include one or more of analyses, summaries, descriptions, transformations, visualizations, correlations and projections.

Further, the at least one sector may include one or more of social activity, business activity, performance, financial services, social services or other data. Further, social activity data may consist of data describing or counting such as demographic data, statistics on population, socio-economic data, healthcare data, and so on. Further, business activity data may consist of data describing or counting equipment, supplies, orders, productions, events such as equipment failures, sales milestones, call center activity, and so on. Further, performance data may consist of time-based entries, personal and/or unit achievements, comparisons and differences across business, national, local, weather, and/or environmental boundaries and, sports performances and so on Further, the queries may be in different language, structure, organization, etc. Further, the language may include, but not limited to, English, Spanish, Arabic, French, Russian, Chinese, etc. Further, the verbal queries may include speech input samples, music input samples, noise input samples, etc. Further, the speech input sample may include a natural language input sample.

Further, the business intelligence insights may refer to any data transmitted by an online platform (such as the online platform 100) to the user device. In some embodiments, the business intelligence insights may be associated with audio responses, textual responses, graphical responses, tabular responses, etc. Further, the audio responses may include one or more sounds. Further, the one or more sounds may include speech samples, music samples, etc. Further, the speech samples may include natural speech samples, artificial speech samples, etc. Further, the graphical responses may include animations, pictures, videos, etc. Further, the pictures may include pie-charts, bar graphs, etc.

In an instance, verbal queries may refer to any queries transmitted from the user device to the online platform. Further, the sectors may include primary sector, manufacturing sector, and service sector. Further, the service sector may include retail services, business service, social work service, media service, entertainment service, health service, transport service, etc. Further, the verbal queries may include speech input samples, music input samples, noise input samples, etc. Further, the speech input samples may include natural language input samples.

Further, at 302, the method 300 may include a step of receiving, using a communication device, at least one verbal conversational request for statistical analysis and business intelligence insights associated with the at least one sector from at least one user device associated with at least one user. Further, the at least one user device may include a computing device such as but not limited to a desktop computer, a laptop computer, a tablet computer, a mobile device, and so on.

Further, at 304, the method 300 may include a step of analyzing, using a processing device, the at least one verbal conversational request for statistical analysis and business intelligence insights. Further, the analyzing may include at least one analyzing method. Further, the at least one analyzing method may include artificial intelligence (AT) analysis, deep learning, natural language processing (NLP), keyword recognition, etc. Further, in some embodiments, the analyzing may include performing natural language processing (NLP) on the at least one verbal conversational request for statistical analysis and business intelligence insights. Further, the natural language processing may be configured for interpreting the at least one verbal conversational request for statistical analysis and business intelligence insights. Further, the at least one verbal conversational request for statistical analysis and business intelligence insights comprises at least one natural language. Further, in some embodiments, the analyzing may include performing artificial intelligence analysis on the at least one verbal conversational request for statistical analysis and business intelligence insights. Further, the artificial intelligence analysis may be configured to determine at least one query indicator. Further, the at least one query indicator may correspond to the at least one verbal conversational request for statistical analysis and business intelligence insights, wherein the at least one query indicator may facilitate the identifying of the at least one dataset.

Further, at 306, the method 300 may include a step of identifying, using the processing device, at least one dataset based on the analyzing. Further, the at least one dataset may be associated with the at least one verbal conversational request for statistical analysis and business intelligence insights. Further, the at least one analyzing method may be used to identify the at least one dataset. Further, the at least one dataset may be associated with at least one data format. Further, the at least one data format may include a tabular format, a pie-chart format, a bar graph format, tubular format, etc.

In an alternate embodiment, the method 300 may include a step of building, using the processing device, at least one dataset based on the analyzing.

In an alternate embodiment, the method 300 may include a step of configuring, using the processing device, at least one dataset based on the analyzing.

Further, at 308, the method 300 may include a step of retrieving, using a storage device, at least one dataset from at least one database. Further, the at least one dataset may be associated with at least one database. Further, the at least one database may be associated with at least one server. Further, the at least one database may include a public database, a private database, etc.

Further, at 310, the method 300 may include a step of generating, using the processing device, at least one business intelligence insight corresponding to at least one verbal conversational request for statistical analysis and business intelligence insights based on the at least one dataset. Further, the at least one business intelligence insight may consist of an audio response, a textual response, a graphical response, tabular response, etc. Further, the audio response may include one or more sounds. Further, the one or more sounds may include speech samples, music samples, etc. Further, the speech samples may include natural speech samples, artificial speech samples, etc. Further, the graphical response may include a picture, a video, etc. Further, the picture may include a pie-chart, a bar graph, etc. Further, the at least one business intelligence insight may be converted and arranged according to a defined format. Further, the defined format may be in accordance with the at least one user.

Further, at 312, the method 300 may include a step of transmitting, using the communication device, the at least one business intelligence insight to at least one user device. Further, the at least one user device may be configured for presenting the at least one business intelligence insight to the at least one user.

In further embodiments, the method 300 may include retrieving, using the storage device, consideration data associated with the at least one user from a database. Further, the consideration data may include at least one user characteristic. Further, the at least one user characteristic may be associated with the at least one user. Further, the at least one user characteristic may include an affiliation, a historical record, etc. Further, the at least one dataset may be identified based on the consideration data.

In further embodiments, the method 300 may include receiving, using the communication device, at least one user device characteristic associated with the at least one user device from the at least one user device. Further, the at least one user device characteristic may include a screen resolution, a screen size, etc. Further, the at least one business intelligence insight may be generated based on the at least one user device characteristic.

In further embodiments, the method 300 may include transmitting, using the communication device, the at least one dataset to the at least one user device. Further, the at least one user device may be configured to receive at least one additional request for statistical analysis and business intelligence insights associated with the at least one dataset from the at least one user. Further, the at least one user device may be configured to generate at least one additional business intelligence insight based on the at least one additional request for statistical analysis and business intelligence insights. Further, the at least one user device may be configured to present the at least one additional business intelligence insight to the at least one user.

In further embodiments, the method 300 may include receiving, using the communication device, at least one data representation type from at least one user device. Further, the at least one business intelligence insight may be generated based on the at least one data representation type.

Figure 4:
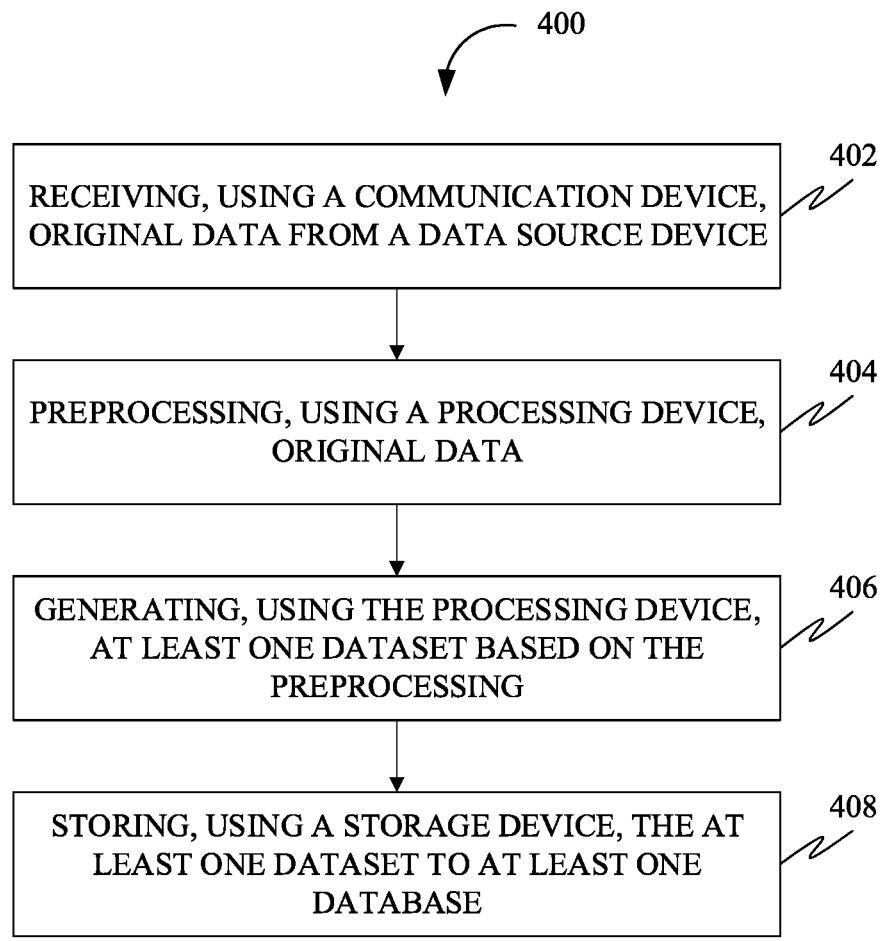
FIG. 4 is a flowchart of a method to facilitate the generation of dataset based on original data from a source device in accordance with some embodiments.

FIG. 4 is a flowchart of a method 400 to facilitate the generation of datasets and business intelligence insight and business intelligence insight based on original data from source devices, in accordance with some embodiments. In an instance, the datasets and business intelligence insight and business intelligence insight may be associated with databases. Further, the datasets and business intelligence insight and business intelligence insight may include a plurality of data items. Further, the plurality of data items may be arranged in at least one data format. Further, the at least one data format may include a tabular format, a pie-chart format, a bar graph format, etc.

In an instance, the original data may be associated with a data source. Further, the original data may be associated with a plurality of languages. Further, the original data may be associated with a plurality of structures. Further, the original data may be associated with a plurality of organizations. Further, the plurality of languages may include English, Spanish, Arabic, French, Russian. Chinese, etc. Further, the plurality of structures may include unsorted structures, undefined structures, etc.

Further, at 402, the method 400 may include a step of receiving, using a communication device, original data from a data source device. Further, the original data may be associated with large storage space. Further, the original data may include a plurality of original data items. Further, the original data may include a plurality of data items. Further, the plurality of original data items may be associated with a plurality of languages. Further, the plurality of original data items may be associated with a plurality of structures. Further, the plurality of original data items may be associated with a plurality of organizations. Further, the plurality of languages may include English, French, Russian, Chinese, etc. Further, the plurality of structures may include unsorted structures, undefined structures, etc. Further, the original data may be associated with at least one of a public database, a private database, etc. Further, the at least one of the public database, the private database, etc. may be associated with the data source device.

Further, at 404, the method 400 may include a step of preprocessing, using a processing device, original data. Further, at least one original data item of the plurality of original data items of the original data may be associated with at least one data anomaly. Further, the at least one data anomaly may include an outlier, a novelty, a noise, a deviation, an exception, a reoccurrence, an ambiguity, etc. Further, the preprocessing may include at least one data preprocessing technique. Further, the at least one preprocessing technique may include a data cleaning technique, a data transformation technique, a data integration technique, etc. Further, data cleaning technique may eliminate the at least one original data item associated with the at least one data anomaly. Further, the data transformation technique may transform the at least one original data item associated with the at least one data anomaly. Further, the preprocessing may include a flagging technique. Further, the flagging technique may flag the at least one original data item associated with the at least one anomaly.

Further, the preprocessing may include building at least one dataset comprised of all non-trivial words and phrases in the database along with synonyms, links to consideration data elements and terms designating subsets of the database.

Further, at 406, the method 400 may include a step of generating, using the processing device, at least one dataset based on the preprocessing. Further, the at least one dataset may include a plurality of data items. Further, at least one data item of the plurality of data items may be associated with the at least one data anomaly.

Further, at 408, the method 400 may include a step of storing, using the storage device, the at least one dataset to at least one database. Further, the storage space of the at least one dataset may be substantially less than the storage space of the original data. Further, the at least one dataset may be identified based on the analyzing, characterizing, summarizing or describing of the verbal conversational request for statistical analysis and business intelligence insights.

Figure 5:
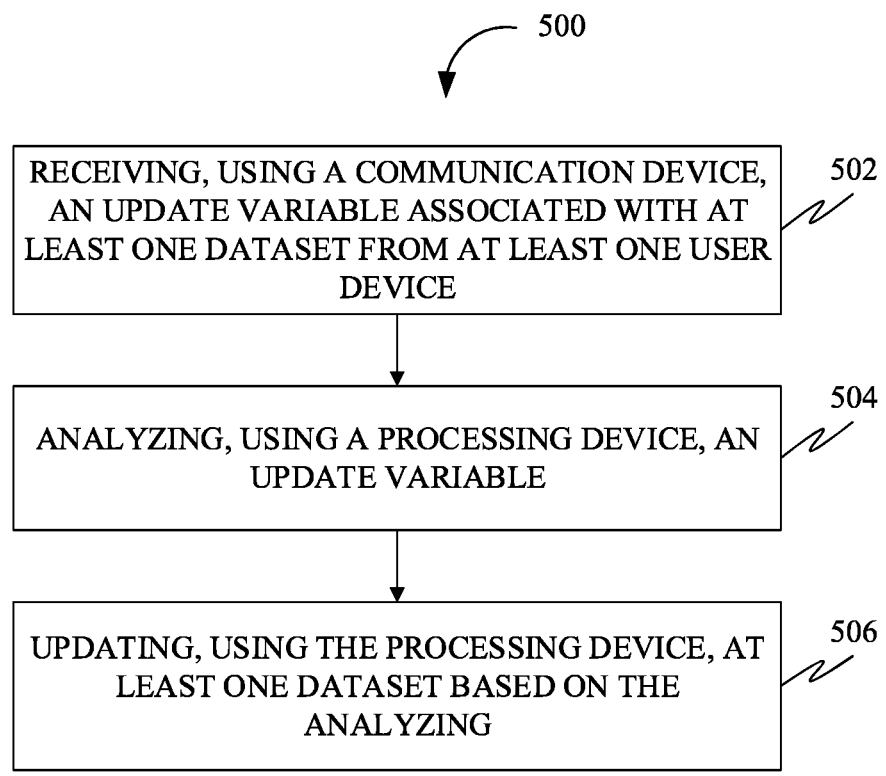
FIG. 5 is a flowchart of a method to facilitate the generation of at least one dataset from an update dataset, in accordance with some embodiments.

FIG. 5 is a flowchart of a method 500 to facilitate updating of datasets and business intelligence insights based on an update variable, in accordance with some embodiments. In an instance, the update variable may be associated with audio update, textual update, data update, etc. Further, the audio update variable may include one or more sounds. Further, the one or more sounds may include speech samples, music samples, etc. Further, the speech samples may include natural speech samples. Further, the natural speech samples may be rendered in natural language. Further, at 502, the method 500 may include receiving, using a communication device, an update variable associated with at least one dataset from at least one user device. Further, the update variable may be associated with a verbal conversational request for statistical analysis and business intelligence insights. Further, the update variable may be given by interacting with the at least one user device. Further, the at least one user device may include a computing device such as but not limited to a desktop computer, a laptop computer, a tablet computer, a mobile device, etc.

Further, at 504, the method 500 may include analyzing, using a processing device, the update variable. Further, the update variable may be analyzed to determine at least one update action associated with the update variable. Further, the at least one update action may be associated with the updating of the datasets and business intelligence insights. Further, the Further, the at least one update action may include an immediate update action, a periodic update action, etc. Further, the immediate update action may be associated with the updating of the datasets and business intelligence insights immediately. Further, the periodic update action may be associated with the updating of the datasets and business intelligence insights periodically. Further, the analyzing may include at least one analyzing method. Further, the at least one analyzing method may include processes of augmenting, purging or refreshing (Collectively, "Refreshing'0 yhr data. Further the refreshing data may be associated with an updated database.

Further, at 506, the method 500 may include updating, using the processing device, at least one dataset based on the analyzing. Further, the at least one dataset may be updated through the original data. Further, the updating may include performing at least one update action. Further, the at least one update action may be associated with the updating of the at least one dataset. Further, the at least one dataset may be identified based on the analyzing of the at least one verbal conversational request for statistical analysis and business intelligence insights.

Figure 6:
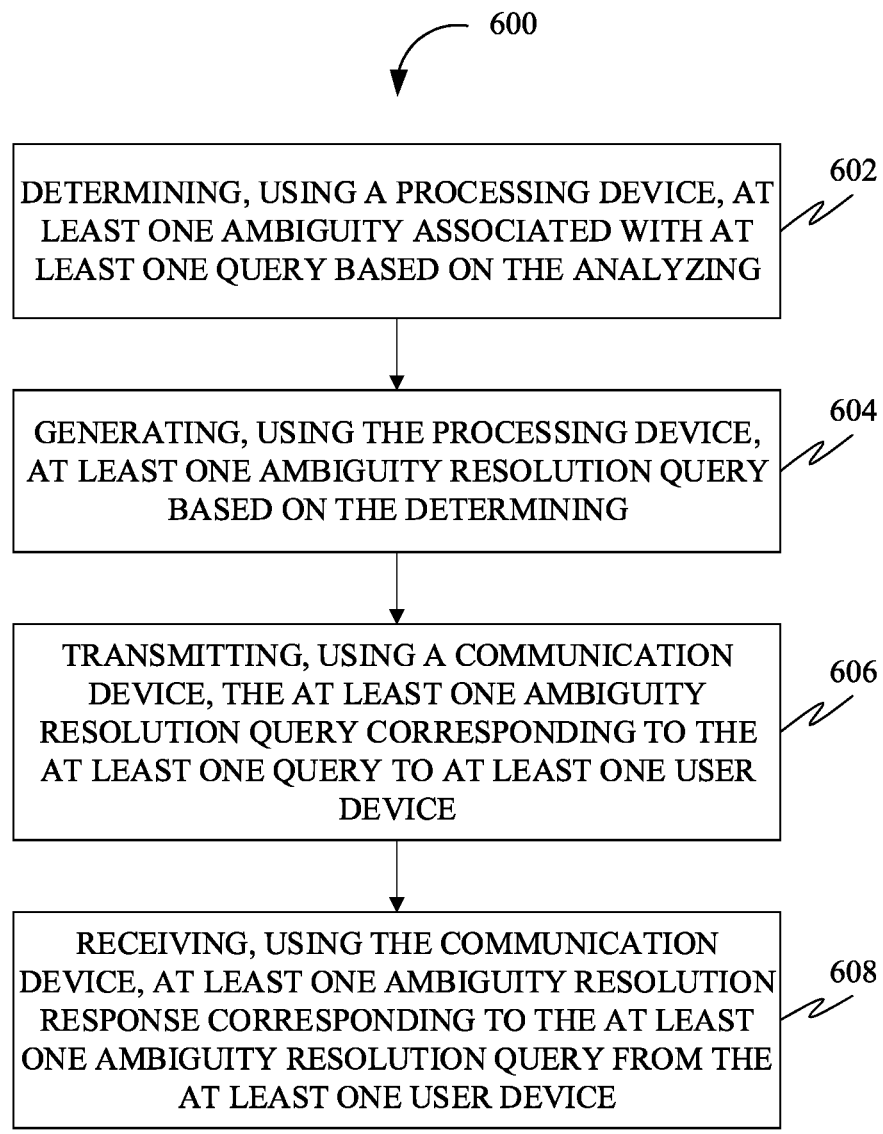
FIG. 6 is a flowchart of a method to facilitate the resolution of ambiguities associated with a request for statistical analysis and business intelligence insights in accordance with some embodiments.

FIG. 6 is a flowchart of a method 600 to facilitate the resolution of ambiguities in the database and/or the at least one verbal conversational request for statistical analysis and business intelligence insights, in accordance with some embodiments. Further, at 602, the method 600 may include determining, using ambiguity associated with the at least one verbal conversational request for statistical analysis and business intelligence insights based on the analyzing. Further, the analyzing may include comparing the at least one verbal conversational request for statistical analysis and business intelligence insights with the plurality of data items associated with the at least one dataset. Further, the at least one ambiguity may be associated with the at least one data anomaly. Further, the at least one anomaly is associated with at least one data item. Further, the analyzing may include matching the at least one verbal conversational request for statistical analysis and business intelligence insights with the at least one data item to determine the at least one ambiguity.

Further, at 604, the method 600 may include generating, using the processing device, an ambiguity resolution query based on the determining. Further, the at least one ambiguity resolution query may be generated to eliminate and/or resolve the at least one ambiguity.

Further, at 606, the method 600 may include transmitting, using the communication device, the at least one ambiguity resolution query corresponding to the at least one verbal conversational request for statistical analysis and business intelligence insights to the at least one user device.

Further, at 608, the method 600 may include receiving, using the communication device, the requested dataset corresponding to the ambiguity resolution query from the at least one user device. Further, the at least one dataset may be identified based on the at least one ambiguity resolution response.

Figure 7:
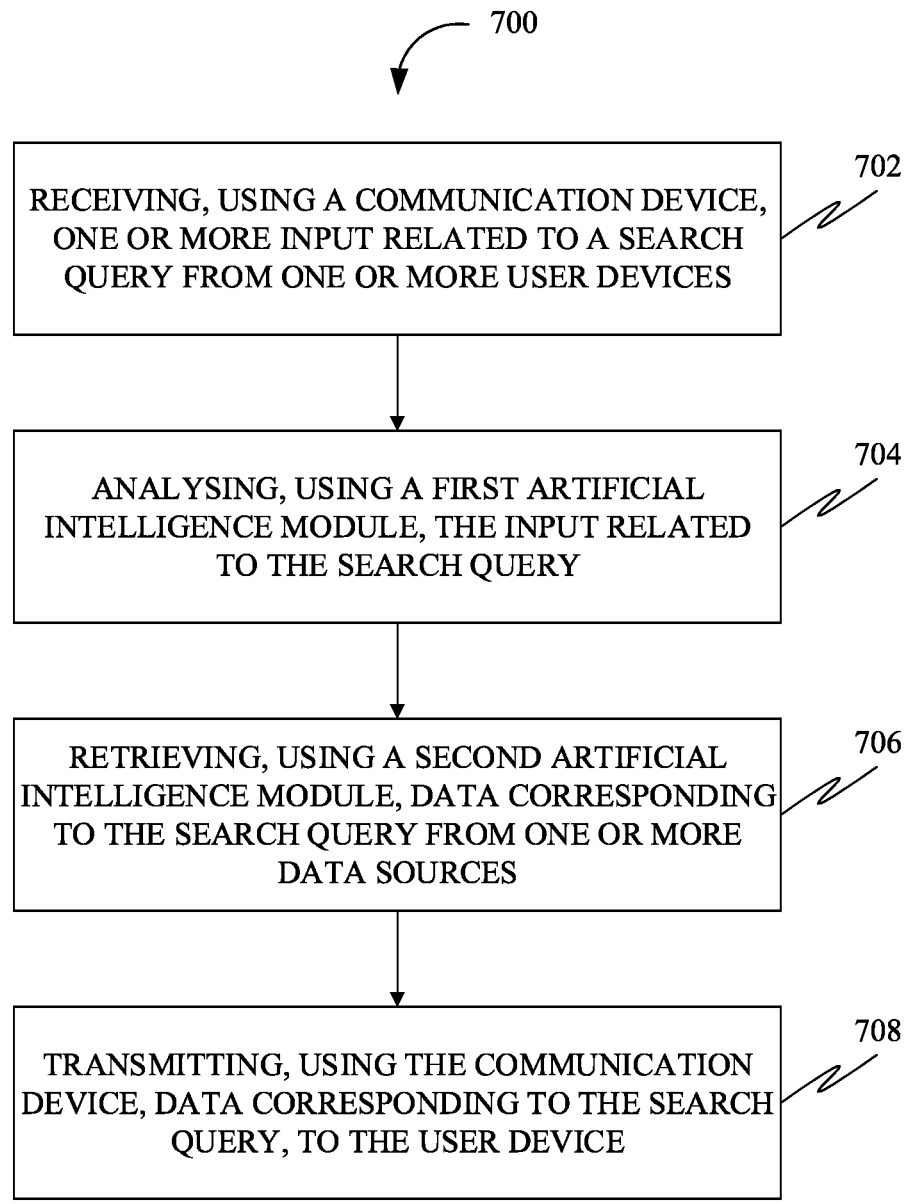
FIG. 7 is a flowchart of a method to facilitate a voice based search interface to search queries related to activity, performance and/or financial data or other data, sourced from private and/or public databases, in accordance with some embodiments.

FIG. 7 is a flowchart of a method 700 to facilitate a voice based search interface to request for satistical analysis related to social data, sourced from private and/or public databases, in accordance with some embodiments. Accordingly, at 702, the method 700 may include a step of receiving, using a communication device, input related to a request for statistical analysis and business intelligence insights from one or more user devices. Further, the input related to the request for statistical analysis and business intelligence insights, received from the one or more user device may be a voice input, a text input, a pictorial input, and so on. Further, the input related to the request for statistical analysis and business intelligence insights may inquire about social service data. Further, the social service data may consist of demographic data, statistics on population, socio-economic data, healthcare data, and so on. Further, the one or more user devices may belong to one or more users. Further, the input related to the request for statistical analysis and business intelligence insights may be received through an input mechanism of the one or more user devices such as, for example, a desktop computer, laptop computer, a tablet computer, a mobile device, a wearable device, and so on. Further, the one or more user device may be configured to communicate with the communication device of a server computer. Accordingly, in an instance, the input related to the request for statistical analysis and business intelligence insights received through the input mechanism may be transmitted from the one or more user device to the server computer.

Further, at 704, the method 700 may include a step of analyzing, using a first artificial intelligence module, the input related to the request for statistical analysis and business intelligence insights. Further, the analysis of the input related to the request for statistical analysis and business intelligence insights may involve the feature of using the first artificial intelligence module to interpret the request for statistical analysis and business intelligence insights. Further, the first artificial intelligence module may be used to determine whether the input related to the request for statistical analysis and business intelligence insights may be a bona fide request for statistical analysis and business intelligence insights. Further, the first artificial intelligence module may facilitate utilizing of an adaptive artificial intelligence language understanding module embedded into a recognition engine, to determine which databases to search to find requested data. Further, decisions of choosing databases to search corresponding to the input related to the search may be in part determined by the first artificial intelligence module on basis of characteristics of the one or more users, whose characteristics may include history, previous retrievals, company affiliation, including industry, company size, company business model etc.), department, title, location, time of day, and other factors. Further, the analysis may include a log of past queries made, actions taken, data requested and business intelligence insights previously created and utilized by the one or more user.

Further, at 706, the method 700 may include a step of retrieving, using the second artificial intelligence module, data corresponding to the request for statistical analysis and business intelligence insights from one or more data sources. Further, the first artificial intelligence module may facilitate utilizing of an adaptive artificial intelligence language understanding module embedded into a recognition engine, to determine most suitable databases to search, to find requested data, and the second artificial intelligence module may form a plurality of computer-executable queries to retrieve data corresponding to the request for statistical analysis and business intelligence insights. Further, amongst all databases such as public databases, private databases, determination of related one or more data resources may be done by checking for availability of required data, corresponding to the input related to the request for statistical analysis and business intelligence insights. Further, best ways to communicate with the one or more data sources and concerned components of the data resources may be determined. Further, the one or more requests for statistical analysis may be formulated to extract the data corresponding to the input related to the request for statistical analysis and business intelligence insights. Further, best form of retrieved data to be delivered may be achieved and most suitable report format, from a stored library of available report formats, for best communication of the retrieved data may be established corresponding to the input related to the request for statistical analysis and business intelligence insights.

Further, at 708, the method 700 may include a step of transmitting, using the communication device, data corresponding to the request for statistical analysis and business intelligence insights, to the user device. Further, the retrieved data corresponding to the input related to the request for statistical analysis and business intelligence insights may be formatted and converted according to an indicated format by the one or more user operating the user devices. Further, desired destination of the retrieved data corresponding to the input related to the request for statistical analysis and business intelligence insights may be determined and the retrieved data may be transferred to the desired destination. Further, the user device may be a desktop computer, laptop computer, a tablet computer, a mobile device, a wearable device, and so on. Further, the transfer may be via direct copying, text messaging, email and/or other transfer mechanisms as transfer mechanisms as may be available to the user.

Figure 8:
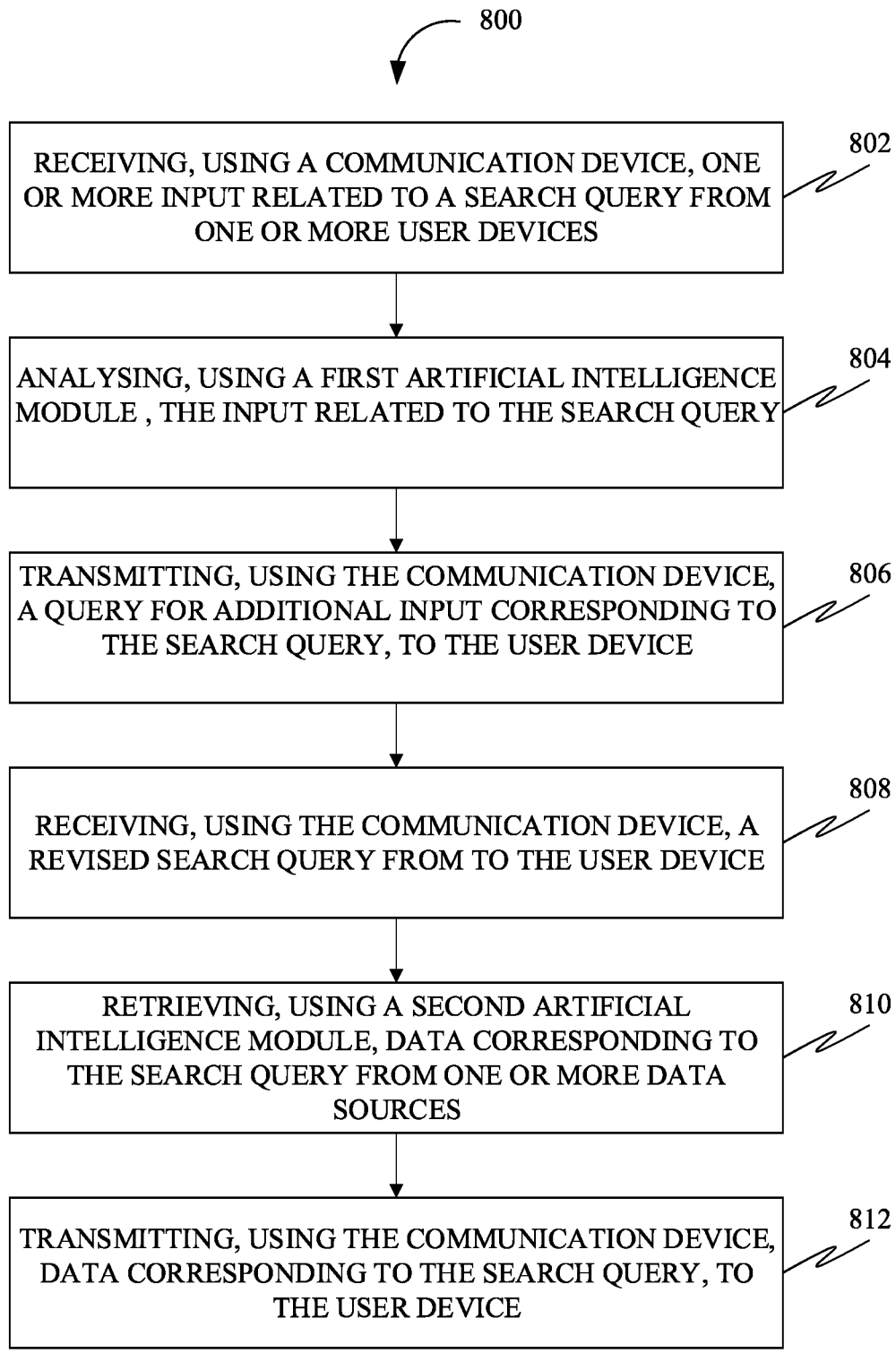
FIG. 8 is a flowchart of a method to facilitate a voice based search interface to request for satistical analysis related to activity, performance and/or financial data or other data, and also updating and/or adding additional information to these requests for satistical analysis, in accordance with some embodiments.

FIG. 8 is a flowchart of a method 800 to facilitate a voice based search interface to requests for satistical analysis related activity, performance and/or financial data or other data, and also updating and/or requesting additional information in addition to the first business intelligence insight, in accordance with some embodiments. Accordingly, at 802, the method 800 may include a step of receiving, using a communication device, input related to a previous request for statistical analysis and business intelligence insights from one or more user devices. Further, the input related to the previous request for statistical analysis and business intelligence insights, received from the one or more user device may be a voice input, a text input, a pictorial input, and so on. Further, the input related to the request for statistical analysis and business intelligence insights may inquire about social service data. Further, the social service data may consist of demographic data, statistics on population, socio-economic data, healthcare data, and so on. Further, the one or more user devices may belong to one or more users. Further, the input related to the previous request for statistical analysis and business intelligence insights may be received through an input mechanism of the one or more user devices such as, for example, a desktop computer, laptop computer, a tablet computer, a mobile device, a wearable device, and so on. Further, the one or more user device may be configured to communicate with the communication device of a server computer. Accordingly, in an instance, the input related to the previous request for statistical analysis and business intelligence insights received through the input mechanism may be transmitted from the one or more user device to the server computer.

Further, at 804, the method 800 may include a step of analysing, using a first artificial intelligence module, the input related to the previous request for statistical analysis and business intelligence insights. Further, the analysis of the input related to the request for statistical analysis and business intelligence insights may involve the feature of using the first artificial intelligence module to interpret the previous request for statistical analysis and business intelligence insights. Further, the first artificial intelligence module may be used to determine whether the input related to the previous request for statistical analysis and business intelligence insights may be a bona fide request for statistical analysis and business intelligence insights for statistical analysis. Further, the first artificial intelligence module may facilitate utilizing of an adaptive artificial intelligence language understanding module embedded into a recognition engine, to determine which databases to search to find requested data. Further, decisions of choosing databases to search corresponding to the input related to the search may be in part determined by the first artificial intelligence module on basis of characteristics of the one or more users, whose characteristics may include history, previous retrievals, company affiliation, title, and other factors. Further, the analysis may include a log of past queries made, actions taken, data requested and analyses previously created and utilized by the one or more user.

Further, at 806, the method 800 may include a step of transmitting, using the communication device, additional input corresponding to the new or previous requests for statistical analysis, to the user device. Further, an artificial intelligence module may determine a need for additional information to satisfy the request for statistical analysis and business intelligence insights and may request such additional information by initiating a query back to the one or more user asking for additional information and/or offering choices the one or more user may select. Further, the one or more user may be given an option to either update the input related to the new request for statistical analysis and business intelligence insights, add new information to the input related to the request for statistical analysis and business intelligence insights or may choose from the options given by the artificial intelligence module to improve the input related to the request for statistical analysis and business intelligence insights.

Further, at 808, the method 800 may include a step of receiving, using the communication device, a revised new request for statistical analysis and business intelligence insights from the user device. Further, the one or more user may send an additional information and/or an updated request for statistical analysis and business intelligence insights after the input related to the request for statistical analysis and business intelligence insights has been analysed and interpreted by the first artificial intelligence module. Further, the one or more user may either update the input related to the request for statistical analysis and business intelligence insights, add new information to the input related to the request for statistical analysis and business intelligence insights or may also choose from the options given by the artificial intelligence module to improve the input related to the request for statistical analysis and business intelligence insights.

Further, at 810, the method 800 may include a step of retrieving, using the second artificial intelligence module, data corresponding to the new request for statistical analysis and business intelligence insights from one or more data sources. Further, the first artificial intelligence module may facilitate utilizing of an adaptive artificial intelligence language understanding module embedded into a recognition engine, to determine most suitable databases to search, to find requested data, and the second artificial intelligence module may form a plurality of computer-executable queries to retrieve data corresponding to the request for statistical analysis and business intelligence insights. Further, amongst all data databases such as public databases, private databases, determination of related one or more data resources may be done by checking for availability of required data, corresponding to the input related to the request for statistical analysis and business intelligence insights. Further, best ways to communicate with the one or more data sources and concerned components of data resources may be determined. Further, the one or more request for statistical analysis may be formulated to extract the data corresponding to the input related to the request for statistical analysis and business intelligence insights. Further, best form of retrieved data to be delivered may be achieved and most suitable report format, from a stored library of available report formats, for best communication of the retrieved data may be established corresponding to the input related to the request for statistical analysis and business intelligence insights.

Further, at 812, the method 800 may include a step of transmitting, using the communication device, data corresponding to the new request for statistical analysis and business intelligence insights, to the user device. Further, the retrieved data corresponding to the input related to the request for statistical analysis and business intelligence insights may be formatted and converted according to an indicated format by the one or more user operating the user devices. Further, desired destination of the retrieved data corresponding to the input related to the request for statistical analysis and business intelligence insights may be determined and the retrieved data may be transferred to the desired destination. Further, the user device may be a desktop computer, laptop computer, a tablet computer, a mobile device, a wearable device, and so on. Further, the transfer may be via direct copying, text messaging, email and/or other transfer mechanisms as may be available to the user.

Figure 9:
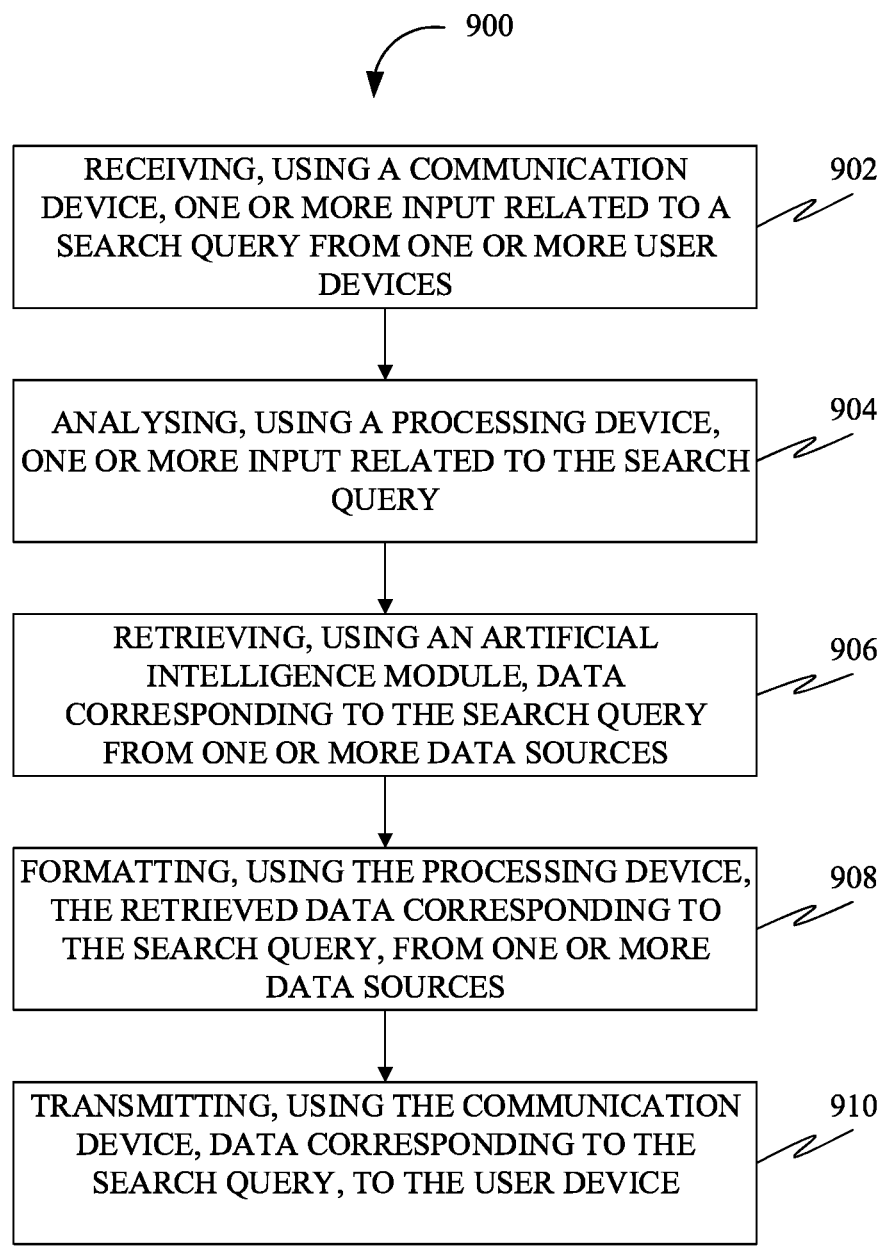
FIG. 9 is a flowchart of a method to receive a request for statistical analysis and business intelligence insights and retrieve data corresponding to a request for statistical analysis and business intelligence insights depending on feedback from various sensors and formatting it accordingly to transmit it to the one or more user devices, in accordance with some embodiments.

FIG. 9 is a flowchart of a method 900 to receive a request for statistical analysis and business intelligence insights and retrieve data corresponding to a request for statistical analysis and business intelligence insights depending on input from various sensors and formatting it accordingly to transmit it to the one or more user devices, in accordance with some embodiments. Accordingly, at 902, the method 900 may include a step of receiving, using a communication device, input related to a request for statistical analysis and business intelligence insights from one or more user devices. Further, the input related to the request for statistical analysis and business intelligence insights, received from the one or more user device may be a voice input, a text input, a pictorial input, and so on. Further, the input related to the request for statistical analysis and business intelligence insights may inquire about social activity data, business performance data, activity data, financial data etc. Further, the input related to the request for statistical analysis and business intelligence insights may be received through an input mechanism of the one or more user devices such as, for example, a desktop computer, laptop computer, a tablet computer, a mobile device, a wearable device, and so on. Further, the one or more user device may be configured to communicate with the communication device of a server computer. Accordingly, in an instance, the input related to the request for statistical analysis and business intelligence insights received through the input mechanism may be transmitted from the one or more user device to the server computer.

Further, at 904, the method 900 may include a step of analysing, using a processing device, one or more input related to the request for statistical analysis and business intelligence insights. Further, the analysis of the one or more input related to the request for statistical analysis and business intelligence insights may involve the feature of using an artificial intelligence module to interpret the request for statistical analysis and business intelligence insights and to determine which databases to search to find requested data. Further, the request for statistical analysis and business intelligence insights may be associated with a context. Further, the context may correspond to one or more contextual variables, which may be captured by using one or more sensors such as time sensors, location sensors, temperature sensors, humidity sensors, weight sensors, time sensors and so on. Further, the one or more sensors' data may make the request for statistical analysis and business intelligence insights more precise and interpretable. Further, the one or more contextual variables may make the databases to search to find requested data more accessible, precise and accurate.

In an instance, the location sensor may detect the location of the one or more user and may make the request for statistical analysis and business intelligence insights more relevant and precise by providing with the location of the user, if the request for statistical analysis and business intelligence insights may ask for any information about the area of the user.

Further, at 906, the method 900 may include a step of retrieving, using an artificial intelligence module, data corresponding to the request for statistical analysis and business intelligence insights from one or more data sources. Further, the artificial intelligence module may facilitate utilizing of an adaptive artificial intelligence language understanding module embedded into a recognition engine, to determine most suitable databases to search, to find requested data, and may form a plurality of computer-executable queries to retrieve data corresponding to the request for statistical analysis and business intelligence insights. Further, amongst all databases such as public databases, private databases, determination of related one or more data resources may be done by checking for availability of required data, corresponding to the request for statistical analysis and business intelligence insights. Further, best ways to communicate with the one or more data sources and concerned components of data resources may be determined. Further, the one or more requests for statistical analysis may be formulated to extract the data corresponding to request for statistical analysis and business intelligence insights. Further, best form of retrieved data to be delivered may be achieved and most suitable report format, from a stored library of available report formats, for best communication of the retrieved data may be established corresponding to the request for statistical analysis and business intelligence insights.

Further, at 908, the method 900 may involve a step of formatting, using the processing device, the retrieved data corresponding to the request for statistical analysis and business intelligence insights, from one or more data sources. Further, the retrieved data corresponding to the request for statistical analysis and business intelligence insights may be organized and formatted using preset guidelines that may make it easy to manage and analyze the retrieved data. Further, the retrieved data may be formatted according to the needs of the one or more users, making it consistent, accurate and complete. Further, formatting the retrieved data may ensure that all the retrieved data may be consistent and in the same format throughout to ensure smooth combining of the data. Further, the formatting of the retrieved data may ensure best communication with one or more data resources, formulate one or more requests for statistical analysis to extract most accurate and precise data, determine data elements relationship to one another, and so on. Further, the formatting of the retrieved data may determine a report format, from a stored library of available report formats that may best communicate the answer, and may determine the desired destination of the retrieved data. Further, the formatting of the retrieved data may demand the retrieved data to be graphically represented in various forms such as pie charts, bar graphs, and so on.

Further, at 910, the method 900 may include a step of transmitting, using the communication device, data corresponding to the request for statistical analysis and business intelligence insights, to the user device. Further, the retrieved data corresponding to the input related to the request for statistical analysis and business intelligence insights may be formatted and converted according to an indicated format by the one or more user operating the user devices. Further, desired destination of the retrieved data corresponding to the input related to the request for statistical analysis and business intelligence insights may be determined and the retrieved data may be transferred to the desired destination. Further, the user device may be a desktop computer, laptop computer, a tablet computer, a mobile device, a wearable device, and so on.

Figure 10:
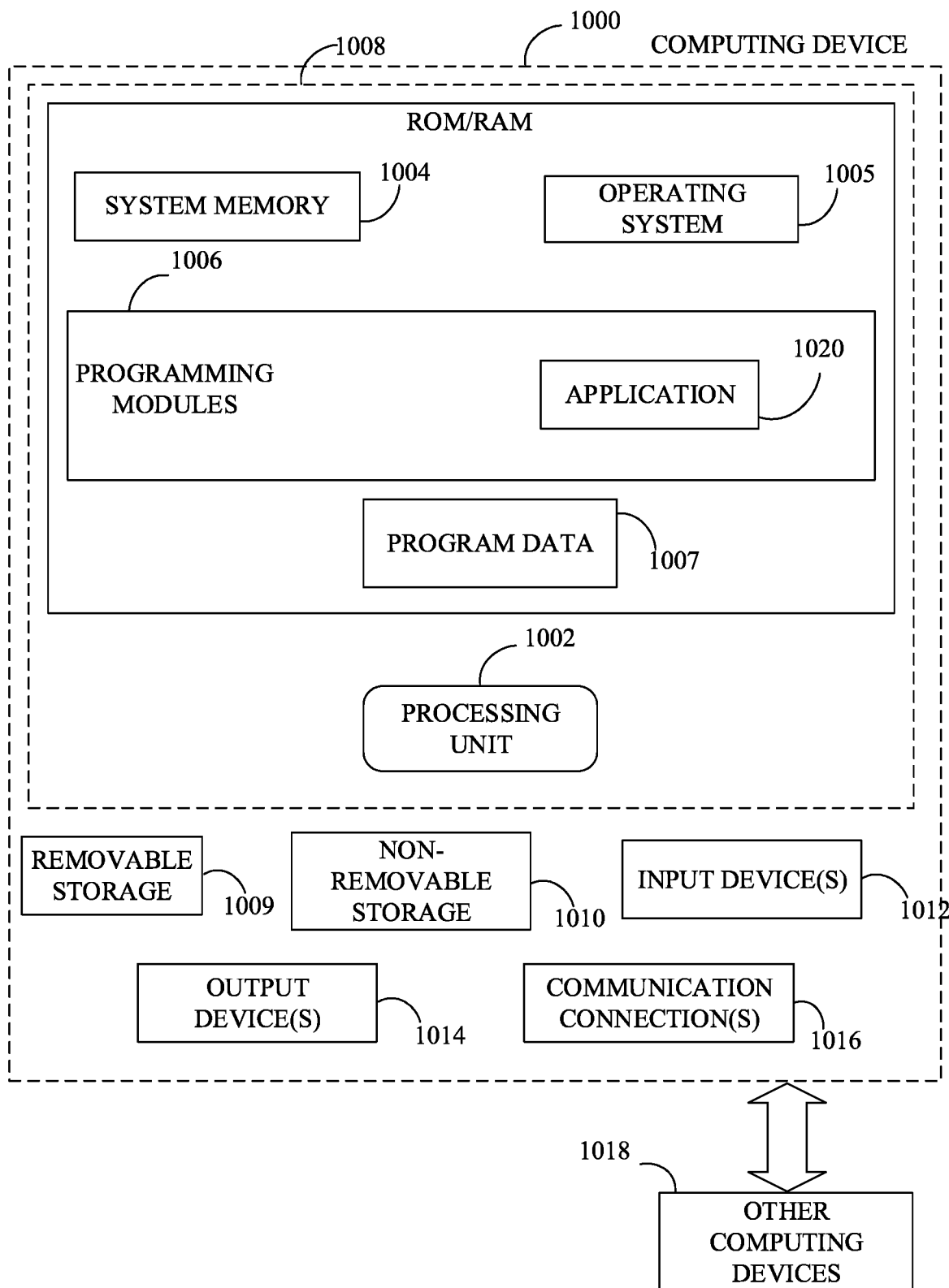
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random-access memory (RAM)), non-volatile (e.g. mad-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and non-volatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include machine learning applications.

Embodiments of the disclosure may be rendered in distributed computing environments where tasks are performed by remote processing devices that are linked through a communications network. In a distributed computing environment, program modules may be located in both local and remote memory storage devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium.

More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Although the present disclosure has been explained in relation to its preferred embodiment, it is to be understood that many other possible modifications and variations can be made without departing from the spirit and scope of the disclosure.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 11:
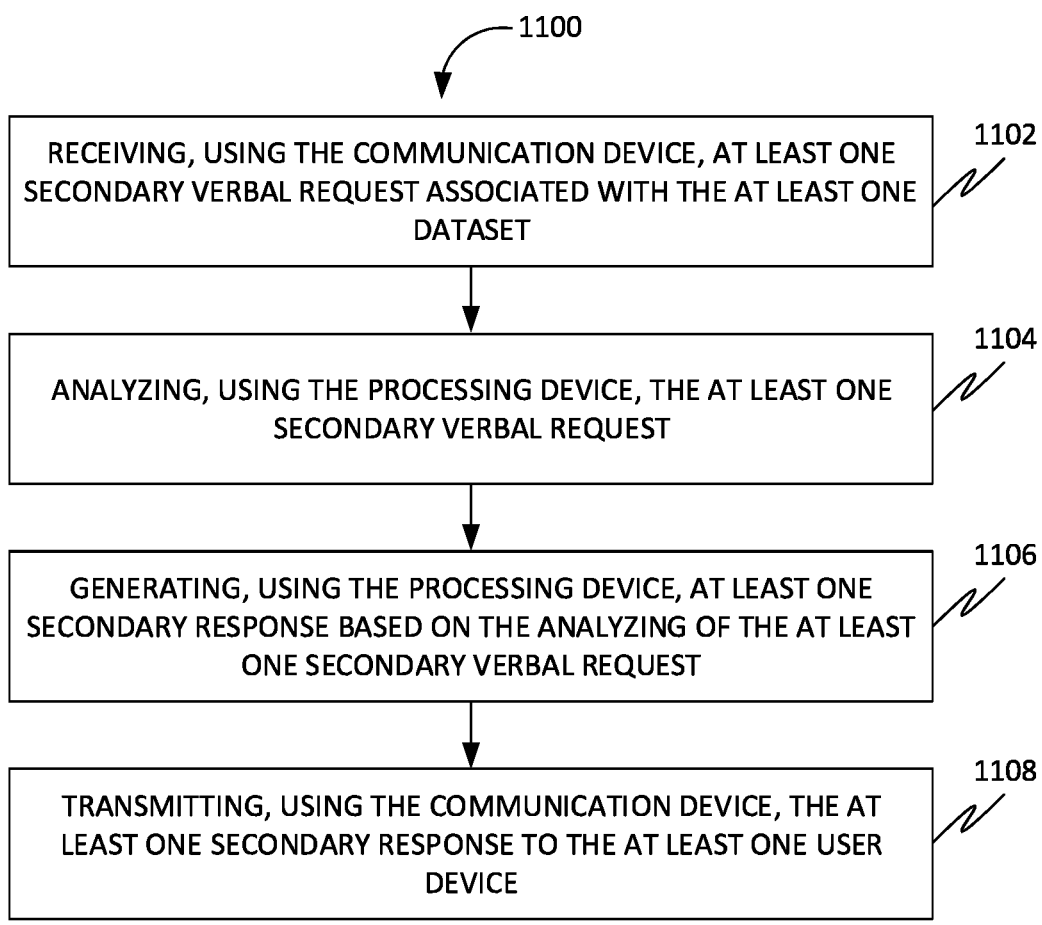
FIG. 11 is a flowchart of a method to facilitate the generation of business intelligence insights based on secondary verbal conversational requests related to at least one sector, in accordance with some embodiments.

FIG. 11 is a flowchart of a method 1100 to facilitate the generation of business intelligence insights based on secondary verbal conversational requests related to at least one sector, in accordance with some embodiments.

At 1102, the method 1100 may include receiving, using the communication device, at least one secondary verbal conversational request associated with the at least one dataset. The at least one secondary verbal conversational request may include optional follow-up or drill-down question(s) associated with the at least one dataset. Further, the optional follow-up or drill-down question(s) may request additional analyses, transformations, breakdowns, sorts, subsets or summaries or descriptions of the at least one dataset.

Further, at 1104, the method 1100 may include analyzing, using the processing device, the at least one secondary verbal conversational request.

Further, the analyzing may include performing natural language processing (NLP) on at least one secondary verbal conversational request, wherein the natural language processing is configured for interpreting the at least one verbal conversational request for statistical analysis and business intelligence insights, wherein the at least one secondary verbal conversational request is spoken by the user in natural language.

Further, the analyzing may include performing artificial intelligence analysis on the at least one secondary verbal conversational request wherein the artificial intelligence analysis is configured to determine at least one query indicator, wherein the at least one query indicator corresponds to the at least one verbal conversational request for statistical analysis and business intelligence insights, wherein the at least one query indicator facilitates the identifying of the at least one dataset.

Further, at 1106, the method 1100 may include generating, using the processing device, at least one secondary business intelligence insight based on the analyzing of the at least one secondary verbal conversational request. Further, the at least one business intelligence insight response may include requested additional analyses, transformations, breakdowns, sorts, subsets or summaries, or descriptions of the at least one dataset.

Further, at 1108, the method 1100 may include transmitting, using the communication device, the at least one secondary business intelligence insight to the at least one user device.

Although the present disclosure has been explained in relation to its preferred embodiment, it is to be understood that many other possible modifications and variations can be made without departing from the spirit and scope of the disclosure.

What is claimed is:

1. A method to facilitate the generation of responses in response to verbal queries related to at least one sector, the method comprising:
   receiving, using a communication device, at least one verbal query associated with the at least one sector from at least one user device associated with at least one user;
   analyzing, using a processing device, the at least one verbal query;
   receiving, using the communication device, original data from a data source device;
   preprocessing, using the processing device, the original data via at least one data preprocessing technique, wherein the at least one preprocessing technique comprises a data cleaning technique, a data transformation technique, a data integration technique and a flagging technique;
   generating, using the processing device, at least one dataset based on the preprocessing;
   identifying, using the processing device, the at least one dataset based on the analyzing;
   retrieving, using a storage device, the at least one dataset from at least one database;
   generating, using the processing device, at least one response corresponding to the at least one verbal query based on the at least one dataset;
   transmitting, using the communication device, the at least one response to the at least one user device;
   retrieving, using the storage device, consideration data associated with the at least one user from a database, wherein the consideration data comprises at least one user characteristic, wherein the at least one user characteristic is associated with the at least one user, wherein the at least one dataset is identified based on the consideration data, wherein the at least one user characteristic include previous retrievals, a company affiliation, a company industry, a company size, a company business model, a company department, a company title, a company location and a historical record; and
   receiving, using the communication device, at least one user device characteristic associated with the at least one user device from the at least one user device, wherein the at least one response is generated based on the at least one user device characteristic, wherein the at least one user device characteristic include a screen resolution and a screen size.

2. The method of claim 1, wherein the analyzing comprises performing natural language processing (NLP) on the at least one verbal query, wherein the natural language processing interprets the at least one verbal query.

3. The method of claim 1, wherein the analyzing comprises performing artificial intelligence analysis on the at least one verbal query, wherein the artificial intelligence analysis determines at least one query indicator, wherein the at least one query indicator corresponds to the at least one verbal query, wherein the at least one query indicator facilitates the identifying of the at least one dataset.

4. The method of claim 1 further comprising:
   storing, using the storage device, the at least one dataset to the at least one database, wherein the storage space of the at least one dataset is substantially less than the storage space of the original data, wherein the at least one dataset is identified based on the analyzing of the at least one verbal query.

5. The method of claim 1 further comprising:
   determining, using the processing device, at least one ambiguity associated with the at least one verbal query based on the analyzing;
   generating, using the processing device, at least one ambiguity resolution query based on the determining;
   transmitting, using the communication device, the at least one ambiguity resolution query corresponding to the at least one verbal query to the at least one user device; and
   receiving, using the communication device, at least one ambiguity resolution response corresponding to the at least one ambiguity resolution query from the at least one user device, wherein the at least one dataset is identified based on the at least one ambiguity resolution response.

6. The method of claim 1 further comprising:
   transmitting, using the communication device, the at least one dataset to the at least one user device, wherein the at least one user device receives at least one additional query associated with the at least one dataset from the at least one user, wherein the at least one user device generates at least one additional response based on the at least one additional query, wherein the at least one user device presents the at least one additional response to the at least one user.

7. The method of claim 1 further comprises:
   receiving, using the communication device, at least one data representation type from at least one user device, wherein the at least one response is generated based on the at least one data representation type.

8. The method of claim 1 further comprising:
   receiving, using the communication device, at least one secondary verbal request associated with the at least one dataset;
   analyzing, using the processing device, the at least one secondary verbal request;
   generating, using the processing device, at least one secondary response based on the analyzing of the at least one secondary verbal request; and
   transmitting, using the communication device, the at least one secondary response to the at least one user device.

9. A system to facilitate the generation of responses based on verbal queries related to at least one sector, the system comprising:
   a communication device;
   a processing device;
   a storage device;
   the communication device receives at least one verbal query associated with at least one sector from at least one user device associated with at least one user;
   the communication device transmits at least one response to the at least one user device;

the processing device analyzes the at least one verbal query;

the communication device receives original data from a data source device;

the processing device preprocesses the original data via at least one data preprocessing technique, wherein the at least one preprocessing technique comprises a data cleaning technique, a data transformation technique, a data integration technique and a flagging technique;

the processing device generates at least one dataset based on the preprocessing;

the processing device identifies the at least one dataset based on the analyzing;

the processing device generates the at least one response corresponding to the at least one verbal query based on the at least one dataset;

the storage device retrieves the at least one dataset from at least one database;

storage device retrieves consideration data associated with the at least one user from a database, wherein the consideration data comprises at least one user characteristic, wherein the at least one user characteristic is associated with the at least one user, wherein the processing device identifies the at least one dataset based on the consideration data, wherein the at least one user characteristic include previous retrievals, a company affiliation, a company industry, a company size, a company business model, a company department, a company title, a company location and a historical record; and the communication device receives at least one user device characteristic associated with the at least one user device from the at least one user device, wherein the processing device generates the at least one response based on the at least one user device characteristic, wherein the at least one user device characteristic include a screen resolution and a screen size.

10. The system of claim 9, wherein the processing device analyzes the at least one verbal query, wherein the analyzing comprises performing natural language processing (NLP) on the at least one verbal query, wherein the natural language processing interprets the at least one verbal query, wherein the at least one verbal query comprises at least one natural language.

11. The system of claim 9, wherein the processing device analyzes the at least one verbal query, wherein the analyzing comprises performing artificial intelligence analysis on the at least one verbal query, wherein the artificial intelligence analysis determines at least one query indicator, wherein the at least one query indicator corresponds to the at least one verbal query, wherein the at least one query indicator facilitates the identifying of the at least one dataset.

12. The system of claim 9 further comprising:

the storage device stores the at least one dataset to the at least one database, wherein the storage space of the at least one dataset is substantially less than the storage space of the original data, wherein the processing device identifies the at least one dataset based on the analyzing of the at least one verbal query.

13. The system of claim 9 further comprising:

the communication device receives at least one secondary verbal request associated with the at least one dataset;

the communication device transmits at least one secondary response to the at least one user device;

the processing device analyzes the at least one secondary verbal request; and the processing device generates the at least one secondary response based on the analyzing of the at least one secondary verbal request.

14. The system of claim 9 further comprising:

the processing device determines at least one ambiguity associated with the at least one verbal query based on the analyzing; and the processing device generates at least one ambiguity resolution query based on the determining; and the communication device transmits the at least one ambiguity resolution query corresponding to the at least one verbal query to the at least one user device; and the communication device receives at least one ambiguity resolution response corresponding to the at least one ambiguity resolution query from the at least one user device, wherein the processing device identifies the at least one dataset based on the at least one ambiguity resolution response.

15. The system of claim 9 further comprising:

the communication device transmits the at least one dataset to the at least one user device, wherein the at least one user device receives at least one additional query associated with the at least one dataset from the at least one user, wherein the at least one user device generates at least one additional response based on the at least one additional query, wherein the at least one user device presents the at least one additional response to the at least one user.

16. The system of claim 9 further comprises:

the communication device receives at least one data representation type from at least one user device, wherein the processing device generates the at least one response based on the at least one data representation type.

* * * * *